Patented May 28, 1935

2,002,945

UNITED STATES PATENT OFFICE 2,002,945

PROCESS OF PRODUCING CEMENTITIOUS MATERIAL

Gilbert A. Hoggatt, Buffalo, N. Y., assignor to Certain-Teed Products Corporation, New York, N. Y., a corporation of Maryland No Drawing. Application March 1, 1934, Serial No. 713,617

11 Claims. (Cl. 106—34)

This invention relates to the manufacture of calcined gypsum and contemplates a new process whereby a calcined gypsum product is obtained which requires less water to bring it, in mixing, to the consistency desired for a workable slurry or mortar than is required by the calcined gypsum manufactured under standard procedure at present.

An object of this invention is to control the water carrying capacity of calcined gypsum so that for a given gypsum rock a calcined product with any desired water carrying capacity, within reasonable limits, may be obtained. The "water carrying capacity" is the amount of water, calculated as percentage by weight of the dry material, which is necessary to bring the mixture to "testing consistency". In my prior application Serial No. 601,285, filed March 25, 1932, and now matured into Patent No. 1,960,538 which is a continuation in part of my prior application Serial No. 312,937, filed October 16, 1928, I have set forth a definition of "testing consistency" accepted as standard at the time of filing said application Serial No. 312,937. By this definition a neat mortar mixture is of "testing consistency" when it gives a circular pat, averaging 9.7 centimeters in diameter when tested with a southard viscosimeter, according to the standard procedure prescribed by the American Society for Testing Materials, and is expressed as the number of cubic centimeters of water required to be added to one hundred (100) grams of the plaster, such as calcined gypsum.

In practice it is found, depending upon the quality, age and other conditions of the calcined gypsum, that one hundred parts of calcined gypsum require from 65 to 100 parts of water by weight, in order to produce a slurry of pouring consistency as required for casts or molds. This calcined gypsum enters into chemical combination with 16 to 25% of its own weight of water, as water of crystallization, in setting or hardening. It is apparent that a large percentage of water is left to be eliminated by evaporation or by absorption by the mold in order to produce the desired product in its dry, set and hardened form. In other words, for every 100 grams of calcined gypsum requiring 70 grams of water to produce a slurry of pouring consistency, approximately 54 to 45 grams of water by evaporation or absorption by the mold must be eliminated from a cast made from such a slurry. This results in the formation of cells or voids in the finished product to such an extent as to materially reduce its density and strength. A low water carrying capacity is necessary where high density and strength of the resulting products are important. The smaller the amount of water required to produce a slurry or mortar, the denser and stronger is the resultant cast.

Heretofore it commonly has been the practice to produce calcined gypsum of reduced water carrying capacity by manufacturing the calcined gypsum according to the usual calcining process and storing the product for a period of time. It has been found by experience that during the time of storage the characteristics of the gypsum are modified in such a way that its water carrying capacity is reduced from that which it possesses immediately upon completion of calcination. Such modification of the water carrying capacity is termed the "natural ageing" of the calcined gypsum. The process of "natural ageing" requires considerable time and is subject to uncontrollable variations due to the changes in atmospheric conditions.

Another object, therefore, of the present invention is to provide a process of treating gypsum, preferably during the process of calcination, whereby the water carrying capacity of the calcined gypsum is reduced by virtue of the effect which certain materials have on the gypsum during calcination. Moreover, by the use of this process the water carrying capacity of the calcined gypsum produced may be controlled by a variation in the amount of these materials present during calcination.

I have discovered in calcining gypsum rock to produce calcined gypsum that the admixture to the gypsum to be calcined or the addition thereto while being calcined of certain substances which will lower the calcining temperature, that is, the decomposition or inversion temperature, of the gypsum will lower the water carrying capacity of the calcined gypsum. The decomposition or inversion temperature, as it is understood in connection with water of crystallization of salts and other compounds which take up water in forming crystals, is the temperature at which the vapor pressure of the water of crystallization of the salt or of the compound is equal to or just exceeds the partial pressure of the water vapor in the surrounding medium or equals or exceeds the saturation pressure if the medium is saturated with water vapor. In the case of gypsum being calcined under standard calcining procedure the pressure in the apparatus is substantially atmospheric pressure since in such a standard process the ground gypsum is heated in a kettle open to the atmosphere or the kettle is maintained at atmospheric pressure and the calcining process is carried on by heating the kettle without permitting substantial rise of the pressure within the kettle in driving off the water of crystallization from the gypsum. However, the partial pressure of the water vapor in the kettle may be less than the pressure of saturated water vapor at the temperature existing within the kettle. The process of my invention, however, does not depend upon the use of any particular pressure and the results may be obtained in calcining processes operating at pressure other than atmospheric pressure.

I have found by adding the substance of the character above mentioned to the gypsum at such a time in its preparation for calcining as will insure the presence of the substance within the kettel during calcination, that I may obtain the reduction of the decomposition temperature. This reduction, whether itself a cause of the lowering of the water carrying capacity of the calcined gypsum or only as an incidental phenomenon, is characteristic and indicative of the effect upon the calcining process and upon the water carrying capacity of the calcined product of calcining the gypsum in the presence of such a substance. I am aware that the use of deliquescent chlorides of certain alkaline earth metals heretofore has been proposed to produce "aged" calcined gypsum. In my co-pending application, Serial No. 601,285 above mentioned, I have disclosed the use of certain alkali compounds including the alkali salts of the inorganic acids, which alkali compounds are of the type which form molecular solutions in water. I have included among said alkali compounds those compounds, whether alkalis or "alkali salts", which are non-deliquescent. In said prior application No. 601,285 I have disclosed and claimed the use of alkali compounds containing a halogen, including the halogen compounds of the alkali metals or of their equivalent, the ammonium radical, whether or not said halogen compounds are deliquescent or non-deliquescent. The invention of the present application relates to certain subject matter included in the disclosure of said prior application, Serial No. 601,285, of which the present application is a division. The invention of the present application relates to the use of an inorganic acid containing a halogen, and particularly to the use of the halogen acids, said acid being admixed with the gypsum so as to be present during calcination for the purpose of lowering the decomposition temperature and securing a product having a low water carrying capacity as above described.

I have found that the halogen acids are effective for the purpose of my invention as above set forth and particularly hydrochloric acid because of its cheapness and availability as compared with other acids containing halogens. Results similar to those obtained with hydrochloric acid, however, are to be expected in using hydrobromic and hydriodic acids. Moreover, I also contemplate within my invention mixtures of these acids.

By careful tests with such substances in calcining gypsum I have found that a marked reduction in the water carrying capacity of the calcined gypsum is effected. For example, I have found that the normal water carrying capacity for a certain freshly calcined gypsum calcined without the use of such reagents is 72 as tested by the method defined above. By the use of one of the reagents, for example hydrochloric acid in the amount of about 1.4 pounds per ton of calcined gypsum produced, I have reduced to 53 the water carrying capacity of this same gypsum as tested when freshly calcined.

While it is well known that the vapor pressure of water solutions of many substances is lower than that of the water alone, and while substances such as are mentioned above as being effective for the reduction of the decomposition or inversion temperature of the gypsum are among those which lower the vapor pressure of water when in solution therein, and while the relation of these phenomena is not so apparent as entirely to explain the result obtained, namely, the reduction of the water carrying capacity of the calcined gypsum, nevertheless, by my experiments and tests I have effectively reduced the water carrying capacity of the calcined product and thus accomplished the desired "artificial ageing" of the calcined gypsum, that is, the reduction of its water carrying capacity by so calcining the gypsum at the reduced decomposition temperature produced by the presence of such reagents.

This new process is of economic importance, because it facilitates the manufacture or production of calcined gypsum of desired water carrying capacity at low temperatures and in short periods of time. Heretofore, calcined gypsum of low water carrying capacity has been manufactured by prolonged periods of calcination, calcination at high temperatures, or by "natural ageing" of the calcined products, as above mentioned. The two former processes involve expenditures of heat and time and result in increased expense for fuel and labor. The latter process, as stated above, is dependent on weather conditions and upon the temperature and humidity of the atmosphere as well as upon storage conditions, and is, moreover, very expensive in that large stocks of calcined gypsum must be kept idle for considerable periods of time. By the present invention a calcined gypsum product of reduced water carrying characteristics is obtained upon completion of calcination and with a minimum expenditure of heat, time and labor. Moreover, the process can be so controlled as to produce within limits any desired water carrying capacity. My invention, however, may be used in combination with any of the former processes to still further reduce or to suitably modify the water carrying capacity obtained by such processes.

As an illustration of one manner in which I carry out my process I may introduce into the kettle or any other type of calcining equipment during calcination, the selected halogen acid which forms the re-agent used according to the present invention. In practice, a predetermined amount of the selected re-agent may be dissolved in water and placed in a suitable container. This container may be equipped with compressed air connections and connections to a spraying device, so that when the compressed air is admitted into the container the solution is forced in a fine spray directly into or upon the calcining mass. The re-agent, however, may be introduced into the kettle in any other convenient manner.

The amount of re-agent used depends to some extent upon the character of the rock to be treated and upon the water carrying capacity desired to be obtained. The following table is indicative of the results which can be expected with a certain grade of material which, under the standard method of calcination showed a water carrying capacity of 68 when tested upon completion of the calcining operation:

| Pounds of re-agent per ton of calcined gypsum | Percent of re-agent | Water carrying capacity of the calcined product |
|---|---|---|
| 0 | .000% | 68 |
| 0.10 | 0.005% | 66 |
| 1 | .050 | 59 |
| 2 | .100 | 57 |
| 3 | .150 | 54 |
| 5 | .250 | 51 |

In general the amounts of re-agent for practical results may be between 1 pound and 3 pounds per ton of calcined product. These amounts are not intended to be definite limits but to indicate the general practical range of the relation of the re-agent to the calcined product. By varying the amount of acid for a given rock any desired water carrying capacity can be obtained, within reasonable limits.

In the regular calcination process when no re-agent is present, the gypsum "boils" or calcines for about forty minutes at about 240 to 250° Fahrenheit. When a re-agent of my invention is present, for instance in amounts of from 1 to 3 pounds per ton of calcined product, the boiling temperature drops to a range of about 235 to 225° Fahrenheit, indicating that the decomposition temperature of the gypsum is lowered by the presence of the re-agents. In some instances I have found that the presence of the re-agents in greater or less proportions than from one to three pounds per ton is necessary to achieve the desired result. Similar results may be obtained with the other re-agents of the type described above as included in my invention.

What I claim as new is:

1. The process of manufacture of calcined gypsum which comprises calcining gypsum, and adding to the gypsum before completion of the calcining operation a halogen acid.

2. The process of manufacture of calcined gypsum which comprises calcining gypsum, and spraying into contact with the gypsum as it is being calcined, a water solution of a halogen acid.

3. The process of manufacture of calcined gypsum which comprises calcining gypsum, and adding hydrochloric acid to the gypsum before completion of the calcining operation.

4. The method of controlling the water carrying capacity of calcined gypsum which comprises adding a halogen acid to the gypsum as it is being calcined, and varying in accordance with variations in said water carrying capacity of the calcined gypsum produced the amount of halogen acid brought into contact with the gypsum being calcined.

5. The method of controlling the decomposition temperature of gypsum during the process of calcination of gypsum to produce calcined gypsum which comprises adding to the gypsum so as to be present during the calcination a predetermined amount of a halogen acid.

6. The method of controlling the water carrying capacity of calcined gypsum which comprises delivering into contact with the gypsum being calcined an amount of a halogen acid controlled in a predetermined ratio to the amount of gypsum being calcined.

7. The process of manufacture of calcined gypsum which comprises calcining gypsum, and adding hydrobromic acid to the gypsum before completion of the calcining operation.

8. The process of manufacture of calcined gypsum which comprises calcining gypsum, and adding hydriodic acid to the gypsum before completion of the calcining operation.

9. The process of manufacture of calcined gypsum which comprises calcining gypsum, and adding to the gypsum before completion of the calcining operation an inorganic acid containing a halogen.

10. The method of controlling the water carrying capacity of calcined gypsum which comprises adding to the gypsum as it is being calcined an inorganic acid containing a halogen, and varying in accordance with variations in said water carrying capacity of the calcined gypsum produced the amount of said inorganic acid containing a halogen which is brought into contact with the gypsum being calcined.

11. The method of controlling the water carrying capacity of calcined gypsum which comprises delivering into contact with the gypsum being calcined an amount of an inorganic acid containing a halogen controlled in a predetermined ratio to the amount of the gypsum being calcined.

GILBERT A. HOGGATT.